US008329822B2

(12) United States Patent
Brown et al.

(10) Patent No.: US 8,329,822 B2
(45) Date of Patent: *Dec. 11, 2012

(54) FLUOROPOLYMER EMULSIONS

(75) Inventors: Gerald Oronde Brown, Wilmington, DE (US); Victoria A. Helinski, New Castle, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/614,488

(22) Filed: Nov. 9, 2009

(65) Prior Publication Data

US 2011/0112233 A1    May 12, 2011

(51) Int. Cl.
*C08F 214/18* (2006.01)

(52) U.S. Cl. ............... 525/200; 427/213.31; 427/213.34; 427/213.36; 427/215; 427/221; 427/222; 252/8.61; 252/8.62; 252/8.81; 252/8.91; 524/430; 525/199; 525/222; 525/227; 525/228; 525/268; 525/269; 525/270; 525/276; 526/79; 526/80; 526/87; 526/90; 526/91; 526/194; 526/242; 526/246; 526/245; 526/319; 526/328; 526/329.5; 526/329.6

(58) Field of Classification Search ............. 427/213.31, 427/213.34, 213.36, 215, 221, 222; 252/8.61, 252/8.62, 8.81, 8.91; 524/430; 525/199, 525/200, 222, 227, 228, 268, 269, 270, 276; 526/79, 80, 87, 90, 91, 194, 242, 245, 246, 526/319, 328, 329.5, 329.6

See application file for complete search history.

(56) References Cited

U.S. PATENT DOCUMENTS

| | | | |
|---|---|---|---|
| 3,282,905 A | 11/1966 | Fasick et al. | |
| 3,592,679 A | 7/1971 | Tully et al. | |
| 3,890,376 A | 6/1975 | Jager | |
| 3,979,469 A | 9/1976 | Jager | |
| 4,391,940 A | 7/1983 | Kuhls et al. | |
| 4,564,561 A | 1/1986 | Lore et al. | |
| 4,590,236 A | 5/1986 | Konig et al. | |
| 4,983,459 A | 1/1991 | Franz et al. | |
| 5,057,577 A | 10/1991 | Matsuo et al. | |
| 5,219,931 A | 6/1993 | Siol et al. | |
| 5,308,705 A | 5/1994 | Franz et al. | |
| 5,370,919 A | 12/1994 | Fleuws et al. | |
| 5,459,212 A | 10/1995 | Krespan et al. | |
| 5,481,028 A | 1/1996 | Petrov et al. | |
| 5,712,335 A | 1/1998 | Tsuda et al. | |
| 5,786,420 A * | 7/1998 | Grandhee | ......................... 525/7 |
| 5,798,406 A | 8/1998 | Feret et al. | |
| 5,888,290 A | 3/1999 | Engle et al. | |
| 5,898,042 A | 4/1999 | Sawada et al. | |
| 5,908,663 A | 6/1999 | Wang et al. | |
| 6,025,521 A | 2/2000 | Krespan et al. | |
| 6,303,686 B1 | 10/2001 | Kitahara et al. | |
| 6,479,605 B1 | 11/2002 | Franchina | |
| 6,653,511 B2 | 11/2003 | Howell et al. | |
| 6,753,376 B1 | 6/2004 | Yamana et al. | |
| 6,790,898 B2 * | 9/2004 | Lee et al. | ....................... 524/458 |
| 7,037,966 B2 | 5/2006 | Zheng et al. | |
| 2005/0043478 A1 | 2/2005 | Huang et al. | |
| 2005/0095933 A1 | 5/2005 | Kimbrell et al. | |
| 2006/0173121 A1 | 8/2006 | Tamai | |
| 2006/0216524 A1 | 9/2006 | Klun et al. | |
| 2006/0281828 A1 | 12/2006 | Nakayama et al. | |
| 2006/0287559 A1 | 12/2006 | Friesen et al. | |
| 2007/0049676 A1 | 3/2007 | Wu et al. | |
| 2008/0008838 A1 | 1/2008 | Rudolf et al. | |
| 2008/0090088 A1 | 4/2008 | Deruelle et al. | |
| 2009/0030114 A1 * | 1/2009 | Wang et al. | ................... 523/201 |

FOREIGN PATENT DOCUMENTS

| | | |
|---|---|---|
| CN | 1690142 | 11/2005 |
| EP | 1632542 | 3/2006 |
| EP | 1767547 | 3/2007 |
| FR | 2852966 | 10/1994 |
| JP | 03244996 | 10/1991 |
| JP | 1994192342 | 7/1994 |
| JP | 08269367 | 10/1996 |
| JP | 09296134 | 11/1997 |
| JP | 2000264948 | 9/2000 |

(Continued)

OTHER PUBLICATIONS

Qu, Journal of Colloid and Interface Science, 217 (2008) 62-69.*

(Continued)

*Primary Examiner* — Robert C Boyle
(74) *Attorney, Agent, or Firm* — Erik W. Perez

(57) ABSTRACT

A polymer composition comprising
A) a first polymer comprising
  (a) hydrophobized nanoparticle;
  (b) $C_1$ to $C_{18}$, straight, branched, or cyclic alkyl(meth) acrylate;
  (c) N-methylol(meth)acrylamide or a monomer of formula (I)

$$R-(OCH_2CH_2)_a-O-C(O)-C(R^1)=CH_2 \qquad (I)$$

wherein R is hydrogen, $C_1$-$C_4$ alkyl, or $-C(O)-C(R^1)=CH_2$, and $R^1$ is H or $-CH_3$;
said first polymer in contact with
B) a second polymer comprising
  (d) a fluorinated monomer of formula (II)

$$R_f^1\text{-L-X}-C(O)-C(R)=CH_2 \qquad (II)$$

wherein $R_f^1$ is a monovalent, partially or fully fluorinated, linear or branched, alkyl radical having 2 to about 100 carbon atoms; optionally interrupted by 1 to about 50 oxygen atoms; wherein the ratio of carbon atoms to oxygen atoms is at least 2:1 and no oxygen atoms are bonded to each other;
  L is a bond or a linear or branched divalent linking group having 1 to about 20 carbon atoms, said linking group optionally interrupted by 1 to about 4 hetero-radicals selected from the group consisting of $-O-$, $-NR^6-$, $-S-$, $-SO-$, $-SO_2-$, and $-N(R^6)C(O)-$ wherein $R^6$ is H or $C_1$ to $C_6$ alkyl, and said linking group optionally substituted with $CH_2Cl$;
  X is $-O-$, $-N(R)-$, or $-S-$, wherein R is H or $CH_3$;
  (e) a monomer as described in (b) above; and
  (f) a monomer as described in (c) above;
provided that the first polymer comprises from about 50% to about 70% by weight of the polymer composition.

9 Claims, No Drawings

FOREIGN PATENT DOCUMENTS

| | | |
|---|---|---|
| JP | 2001040510 | 2/2001 |
| JP | 2003128991 | 5/2003 |
| JP | 2003147340 | 5/2003 |
| JP | 2003231722 | 8/2003 |
| JP | 2005097369 | 4/2005 |
| JP | 2005208290 | 8/2005 |
| JP | 2006219657 | 8/2006 |
| JP | 2006348117 | 12/2006 |
| JP | 2007031712 | 2/2007 |
| JP | 2007070551 | 3/2007 |
| WO | 9511877 | 5/1995 |
| WO | 2004096939 | 11/2004 |
| WO | 2005092997 | 10/2005 |
| WO | 2006045713 | 5/2006 |
| WO | 2006051634 | 5/2006 |
| WO | 2006051833 | 5/2006 |
| WO | 2006051835 | 5/2006 |
| WO | 2006061835 | 6/2006 |
| WO | 2006093748 | 9/2006 |
| WO | 2006116222 | 11/2006 |
| WO | 2009076109 | 6/2009 |

OTHER PUBLICATIONS

U.S. Appl. No. 12/614,482, filed Nov. 9, 2009, Brown et al.

Balague et al., Synthesis of fluorinated telomers, Part 1. Telomerization of vinylidene fluoride with perfluoroalkyl iodides, Journal of fluorine Chemistry (1995), 70(2), 215-223, Elsevier Science S.A.

Naud et al., Synthesis of terminally perfluorinated long-chain alkanethiols, sulfides and disulfides from the corresponding halides, Journal of Fluorine Chemistry, (2000), 104(2), 173-183, Elsevier Science S.A.

Jung et al., Perfluorinated polymer monolayers on porous silica for materials with super liquid repellent properties, Langmuir (2002), 18(16), 6133-6139, American Chemical Society.

Sawada et al., Synthesis and applications of novel fluoroalkyl end-capped oligomers/silica gel polymer hybrids, International Journal of Polymeric Materials (2005), 54(4), 305-310, Taylor & Francis, Inc.

Sawada et al., Synthesis and applications of novel fluoroalkyl end-capped oligomers containing 3,5-dimethyl-4-hydroxybenzyl and 3-(2H-benzotriazol-2-yl)-4-hydroxphenyl segments, International Journal of Polymeric Materials (2005), 54(4), 311-332, Taylor & Francis, inc.

Sawada et al., Synthesis of self-assembled fluoroalkyl end-capped oligomeric aggregates—Applications of these aggregates to fluorinated oligomeric nanocomposites, Progress in Polymer Science (2007), 32(5), 509-533, Elsevier Ltd.

Kim et al., Synthesis, structure and film-forming properties of poly(butyl methacrylate)-poly(methacrylic acid) core-shell latex; Polymer (1994), 35(8), 1779-86.

Juhue et al., Film Formation for Dispersion of Core-Shell Latex Particles; Macromolecules (1995) 28(4), 1306-1308, American Chemical Society.

Park et al, Surface properties and structure of poly(perfluoroalkylethyl methacrylate); Journal of Colloid and Interface Science (1996), 181(1), 284-288.

Marion et al, Core-Shell Latex Particles Containing a Fluorinated Polymer in the Shell. 1. Film Formation Studied by Fluorescence Nonradiative Energy Transfer; J. of Applied Polymer Science (1997), 64(12), 2409-2419, Johh Wiley & Sons, Inc.

Marion et al, Core-Shell Latex Particles Containing a Fluorinated Polymer in the Shell. 2. Internal Structure Studied by Fluorescence Nonradiative Energy Transfer; Macromolecules (1997), 30(1), 123-129, American Chemical Society.

Linemann et al., Latex Blends of Fluorinated and Fluorine-Free Acrylates: Emulsion Polymerization and Tapping Mode Atomic Force Microscopy of Film Formation; Macromolecules (1999), 32(6), 1715-1721; American Chemical Society.

Othegraven et al., Synthesis and characterization of core-shell colloids with fluorocarbon cores; Macromol. Symp. (2000), 151(1), 515-520; Wiley-VCH Verlag GmbH, D-69469 Weinheim.

Thomas et al., Low Free Energy Surfaces Using Blends of Fluorinated Acrylic Copolymer and Hydrocarbon Acrylic Copolymer Latexes; Macromolecules (2000), 33(23), 8828-8841, American Chemical Society.

Cheng et al., Core-Shell Latex Containing Fluorinated Polymer Rich in Shell; J. of Applied Polymer Science (2002), 85(6), 1147-1153; Wiley Periodicals, Inc.

Ha et al, Preparation and Characterization of Core-Shell Particles Containing Perfluoroalkyl Acrylate in the Shell; Macromolecules (2002), 35(18), 6811-6818.

Landfester et al., Convenient Synthesis of Fluorinated Latexes and Core-Shell Structures by Miniemulsion Polymerization; Macromolecules (2002), 35(5), 1658-1662.

Ha et al, Surface properties of core-shell particles containing perfluoroalkyl acrylate in shell, Surface Science (2003), 532-535, 328-333; Elsevier Science B.V.

Smulders et al., Seeded Emulsion Polymerization of Block Copolymer Core-Shell Nanoparticles with Controlled Particle Size and Molecular Weight Distribution Using Xanthate-Based RAFT Polymerization; Macromolecules (2004) 37(12), 4474-4483, American Chemical Society.

Chen, et al., Study of Poly(hexafluorobutyl methacrylate-co-acrylates) latex, PMSE Preprints (2005), 92, 677-678, American Chemical Soeiety. ABSTRACT.

Chen et al., Study of Poly(hexafluorobutyl methacrylate-co-acrylates) latex, Abstracts of Papers, 229th ACS National Meeting, San Diego CA, USA, PMSE-377 (2005); American Chemical Society. ABSTRACT.

Chen et al., Emulsifier-free latex of fluorinated acrylate copolymer, Abstracts of Papers, 229th ACS National Meeting, San Diego CA, USA, POLY-503 (2005); American Chemical Society. ABSTRACT.

Chen et al., Emulsifier-free latex of fluorinated acrylate copolymer, Polymer Preprints (2005), 46(1), 638-639: American Chemical Society. ABSTRACT.

Ha et al., Surface Modification with Perfluoroalkyl Acrylic Polymers; In: Surface Science Research Developments, Nova Science Publishers, Inc. (2005), ISBN 1-59454-158-2, 181-210.

Honda et al., Molecular Aggregation Structure and Surface Properties of Poly(fluoroalkyl acrylate) Thin Films; Macromolecules (2005), 38(13), 5699-5705, American Chemical Society.

Qu et al., Preparation of core-shell emulsion and its application in improving stain resistance of exterior latex paint, Dongnan Daxue Xuebao, Ziran Kexueban (2005), 35(Sup, 1), 162-166; Dongnan Daxue Xuebao, Ziran Kexueban Bianjibu, China. ABSTRACT.

Zhang et al., Investigation of fluorinated polyacrylate latex with core-shell structure: Polymer International (2005), 54(7), 1027-1033, Society of Chemical Industry.

Chen et al., Chemical Components and Properties of Core-Shell Acrylate Latex Containing Fluorine in the Shell and Their Films, J. of Applied Polymer Science (2006), 99(1) 107-114: Wiley Periodicals, Inc.

* cited by examiner

FLUOROPOLYMER EMULSIONS

FIELD OF THE INVENTION

The present invention relates to polymers comprising hydrophobized inorganic oxide particles, fluorinated monomers, and non-fluorinated acrylic monomers prepared by a two-stage emulsion polymerization. The resulting compositions are useful for providing enhanced hydrophobicity and lyophobicity to substrates, in particular to fibrous substrates.

BACKGROUND OF THE INVENTION

Various compositions are known to be useful as treating agents to provide surface effects to substrates. Surface effects include repellency to moisture, soil, and stains, and other effects, which are particularly useful for fibrous substrates such as fibers, fabrics, textiles, carpets, paper, leather, and other such substrates. Many such treating agents are fluorinated polymers or copolymers.

Fluorinated polymer compositions having utility as fibrous substrate treating agents generally contain pendant perfluoroalkyl groups which are generally attached by various connecting groups to polymerizable groups not containing fluorine. The resulting monomer is then generally copolymerized with other monomers, which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use.

U.S. Patent Application 2005/0095933 discloses compositions for treating textiles formed by combining a repellent component, a stain resist component, a stain release component, and particles. Various commercially available fluorinated polymers are employed as the repellent component and the particles are inorganic oxides or basic metal salts. The fluorinated polymers and particles are separately added to a solution, and thus represent a mixture of the polymer and particle, which is applied to the substrate to be treated.

Vinylidene chloride is commonly used in commercially available fluorinated polymers used to treated substrates for surface effects. It is well known that major by-product of polymers containing VDC is hydrochloric acid. Liberated hydrochloric acid not only contributes to the degradation of the polymer, but also may cause de-colorization of the treated textiles and may cause yellowing. In addition, the National Institute for Occupational Safety and Health (NIOSH) has established a recommended exposure limit for vinylidene chloride of the lowest feasible concentration (0.4 ppm, limit of quantitation). NIOSH also considers vinylidene chloride to be a potential human carcinogen. Thus, vinylidene chloride used in treating substrates should be limited.

The expense of the fluorinated polymer dictates that it be used at lower levels in treating substrates to provide surface effects. However, reducing the level of fluorine by using polymers containing shorter chained perfluoroalkyl groups of six carbons or less has not been commercially successful. Thus there is a need for compositions for treating substrates which do not contain vinylidene chloride and impart surface effects including durable water repellency and oil repellency, which maintain levels of performance, while using less of the expensive fluorinated component. The present invention provides such a composition.

SUMMARY OF THE INVENTION

The present invention comprises a polymer composition comprising

A) a first polymer comprising on a water free basis
  (a) from about 0.1% to about 1.0% by weight hydrophobized nanoparticle;
  (b) from about 89% to about 99.8% by weight of one or more monomers of $C_1$ to $C_{18}$, straight, branched, or cyclic alkyl(meth)acrylate;
  (c) from about 0.1% to about 10.0% by weight of one or more monomers selected from the group consisting of N-methylol meth)acrylamide and monomers of formula (I)

$$R—(OCH_2CH_2)_a—O—C(O)—C(R^1)=CH_2 \qquad (I)$$

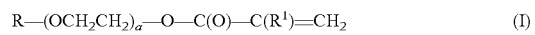

wherein R is hydrogen, $C_1$-$C_4$ alkyl, or —C(O)—C($R^1$)=$CH_2$, and $R^1$ is H or —$CH_3$;
said first polymer in contact with
B) a second polymer comprising on a water free basis
  (d) from about 70% to about 90% by weight fluorinated monomer of formula (II)

$$R_f^1\text{-L-X}—C(O)—C(R)=CH_2 \qquad (II)$$

wherein $R_f^1$ is a monovalent, partially or fully fluorinated, linear or branched, alkyl radical having 2 to about 100 carbon atoms; optionally interrupted by 1 to about 50 oxygen atoms; wherein the ratio of carbon atoms to oxygen atoms is at least 2:1 and no oxygen atoms are bonded to each other;
  L is a bond or a linear or branched divalent linking group having 1 to about 20 carbon atoms, said linking group optionally interrupted by 1 to about 4 hetero-radicals selected from the group consisting of —O—, —$NR^6$—, —S—, —SO—, —$SO_2$—, and —$N(R^6)C(O)$— wherein $R^6$ is H or $C_1$ to $C_6$ alkyl, and said linking group optionally substituted with $CH_2Cl$;
  X is —O—, —N(R)—, or —S—, wherein R is H or $CH_3$;
  (e) from about 10% to 30% by weight of one or more monomers of $C_1$ to $C_{18}$, straight, branched, or cyclic alkyl(meth)acrylate; and
  (f) from about 0.1% to about 10.0% by weight of one or more monomers selected from the group consisting of N-methylol meth)acrylamide and monomers of formula (I)

$$R—(OCH_2CH_2)_a—O—C(O)—C(R^1)=CH_2 \qquad (I)$$

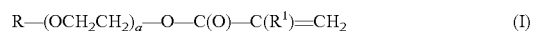

wherein R is hydrogen, $C_1$-$C_4$ alkyl, or —C(O)—C($R^1$)=$CH_2$, and $R^1$ is H or —$CH_3$;
provided that the first polymer comprises from about 50% to about 70% by weight of the polymer composition.

The present invention further comprises a method of providing oil repellency, water repellency, and dynamic water repellency to a substrate comprising contacting the substrate with a polymer composition as described above.

The present invention further comprises a substrate treated according to the method described above.

DETAILED DESCRIPTION OF THE INVENTION

Hereinafter trademarks are designated by upper case.

The term "(meth)acrylate" encompasses esters of methacrylic acid and acrylic acid unless specifically stated otherwise. For instance, hexyl(meth)acrylate encompasses both hexyl acrylate and hexyl(meth)acrylate.

Herein the terms "fluorinated acrylate(s)" "fluorinated thioacrylate(s)" and "fluorinated acrylamide(s)" refer to compounds of formula (IIa), (IIb), (IIc), (IId), and (IIe) as described below, wherein R is selected from the group consisting of H, Cl, F, and CH$_3$, unless specifically defined otherwise.

This invention relates to a composition comprising a fluorinated polymer useful for imparting oil repellency and water repellency to fibrous substrates, such as textiles. The polymer is derived from a two stage emulsion polymerization of fluorinated(meth)acrylates, non-fluorinated(meth)acrylates, and nanoparticles.

The present invention provides compositions for imparting surface effects to substrates in which emulsion polymers prepared using a two stage polymerization process have non-fluorinated hydrophobized particles dispersed during the first stage polymerization reaction used to form the polymers. The resulting composition provides comparable or enhanced performance and durability of surface effects to treated substrates compared to traditional commercially available treatment agents not containing particles. It has been found that incorporation of small amounts as low as 0.1% by weight of a particle into the polymer structure is effective to enhance performance. Preferably from about 0.1% to about 1% by weight, more preferably from about 0.1% to about 0.8% by weight, and more preferably from about 0.2% to about 0.6% by weight, of the particle component is incorporated into the polymer. Alternatively from about 0.2% to about 1%, preferably from about 0.3% to about 1%, and preferably from about 0.3% to about 8%, by weight of the particle component is present in the polymer. This invention permits use of lower amounts of treatment agents, or use of agents containing short perfluoroalkyl chains of less than 8 carbon atoms (and thus containing less fluorine) while providing comparable or superior performance.

Preferred polymers for use in the present invention comprise those incorporating a fluorinated component in which $R_f^1$ is a monovalent, partially or fully fluorinated, linear or branched, alkyl radical having 2 to about 7 carbon atoms; optionally interrupted by 1 to about 6 catenary oxygen atoms; wherein the ratio of carbon atoms to oxygen atoms is at least 2:1. Such polymers contain less fluorine than conventional commercial surface treating agents, yet provide substantially equivalent or superior surface properties to substrates treated therewith. In addition the preferred polymers of the present invention contain no vinylidene chloride, so provide environmental advantages.

The polymer composition of the present invention is comprised of a first and a second polymer in physical contact with each other. The first polymer is formed in an initial polymerization followed by formation of the second polymer in a second polymerization. The second polymer can completely surround the first polymer forming a core shell structure wherein the first polymer is the core and the second polymer is the shell. Alternatively the second polymer can partially surround the first polymer. The term "core shell" as used herein includes both of these alternatives. Preferred is the formation of a core shell structure because the second polymer is fluorinated and it is desirable to have this polymer be on the outside of the structure. This maximizes contact of the second polymer with a substrate to be treated and can aid in maximizing the surface effects imparted to the substrate.

The polymers of the present invention are prepared by a two stage polymerization. In a first polymerization, components (a), (b), and (c) as described above are reacted to yield a first polymer. Thereafter the resulting first polymer is reacted in a second polymerization, with components (d), (e), and (f), as described above, to yield the second polymer, which is the polymer of the present invention. The weight percents of the components for each polymerization are chosen to add up to 100%. The first stage polymer is from about 50% to about 70% by weight of the final product polymer. Preferably the first stage polymer is from about 55% to about 70% of the final product polymer. More preferably the first stage polymer is from about 55% to about 65% by weight of the final product polymer.

The first stage polymer is prepared from a first polymerization comprising components (a) hydrophobized nanoparticles, (b) one or more monomers of alkyl(meth)acrylate, and (c) one or more monomers selected from the group consisting of N-methyloyl(meth)acrylamide and monomers of formula (I) as described above.

The hydrophobized nanoparticle component used in the first polymerization can be any inorganic oxide particle, having groups such as hydroxyl, amino groups, or a mixture thereof. In one embodiment the hydrophobized nanoparticle component comprises inorganic oxides of Si, Ti, Zn, Mn, Al, and Zr. Preferably the inorganic oxides have an average particle size of about 10 to 500 nm; 50 to 500 nm; 80 to 400 nm and 100 to about 300 nm. In another embodiment particulate component is a fumed particle. In a further embodiment the particulate component is a colloidal particle made by hydrolysis of an alkoxy silane, chlorosilane, metal alkoxide, or metal halide.

In one embodiment the inorganic oxides are at least partially surface-modified with hydrophobic groups; preferably hydrophobic groups derived from reaction of inorganic oxides with hydrophobic surface treatment reagents selected from the group consisting of alkyl halosilanes including C$_1$ to C$_{18}$ alkyl trichlorosilanes, C$_1$ to C$_{18}$ dialkyl dichlorosilanes, C$_1$ to C$_{18}$ trialkyl chlorosilanes; alkyl alkoxysilanes including C$_1$ to C$_{18}$ alkyl trimethoxysilanes, C$_1$ to C$_{18}$ dialkyl dimethoxysilanes, C$_1$ to C$_{18}$ trialkyl methoxysilanes, alkyl disilazanes including hexamethyl disilazane; polydialkyl siloxanes including polydimethyl siloxane; and mixtures thereof.

Commercially available surface modified inorganic oxides useful in forming the compositions of the invention include fumed silicas under the tradename AEROSIL, AEROXIDE, and R series available from Evonik Industries, Essen, Germany; specifically AEROXIDE LE1, LE2, and LE3, are useful. Other commercial surface modified inorganic oxides include those under the tradename CABOSIL from Cabot Corporation, Tuscola, Ill.; and the HDK particle series from Wacker Chemie, Munich, Germany.

Colloidal particles useful in compositions of the invention include colloidal aluminas, for example, CATAPAL and DISPAL aluminas available from Vista Chemical Company, West Creek, N.J.; colloidal silica suspensions, for instance, NALCO silicas available from Nalco Chemical Company, Naperville, Ill.

Specialty inorganic oxides at least partially surface-modified with hydrophobic groups, useful in the invention, can be made by synthesis. One embodiment of the invention is a composition wherein the inorganic oxides are surface modified inorganic oxide particles comprising an oxide of M atoms independently selected from the group consisting of Si, Ti, Zn, Zr, Mn, Al, and combinations thereof; at least one particle having a surface covalently bonded to at least one group represented by formula (IV)

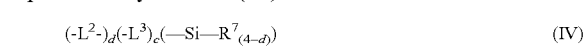

wherein:
L$^2$ represents an oxygen covalently bonded to M; and each L$^3$ is independently selected from the group consisting of H, a C$_1$-C$_2$ alkyl, and OH; d and c are integers such that: d is greater than or equal to 1, c is greater than or equal to 0, and the sum (d+c) is less than or equal to 3;

$R^7$ is a linear, branched, or cyclic alkyl group containing 1 to 18 carbon atoms.

The particles are prepared by reaction of the inorganic oxide and various alkyl siloxanes, silizanes, polyalkyl siloxanes. These reactions are typically conducted in a hydrocarbon solvent, such as pentane, heptane, or iso-octane, under an inert atmosphere, such as nitrogen, with heating to a temperature of from about 50° C. to about 100° C. After several hours the product is separated by conventional means, such as centrifuging, and washed. The resulting particles have at least one covalently bonded oxygen to the particle and a hydrophobized silicone and at least one hydrogen.

The component (b) within the first stage emulsion polymerization of the invention is one or more monomers selected from the group consisting of an alkyl(meth)acrylate, wherein alkyl is $C_1$ to $C_{18}$, straight, branched, or cyclic. Preferably the proportion of component (b) is from about 89% to about 99.8% by weight of the first polymer, more preferably from about 90% to about 98% by weight, and more preferably from about 91% to about 97% by weight.

Specific alkyl(meth)acrylate monomers useful in component (b) include stearyl(meth)acrylate, lauryl(meth)acrylate, 2-ethylhexyl(meth)acrylate, tridecyl(meth)acrylate, hexyl (meth)acrylate, cyclohexyl(meth)acrylate, styrene, alpha-methylstyrene, and others. Preferred monomers are stearyl (meth)acrylate, 2-ethylhexyl(meth)acrylate, hexyl(meth) acrylate, cyclohexyl(meth)acrylate, lauryl(meth)acrylate, tridecyl(meth)acrylate, or a mixture thereof. Such monomers are commercially available.

The component (c) within the first stage emulsion polymerization is one or more monomers selected from the group consisting of N-methylol (meth)acrylamide, and monomers of the formula:

  (I)

wherein a is 1 to about 10, R is hydrogen, $C_1$-$C_4$ alkyl, or —C(O)—C($R^1$)=$CH_2$, and $R^1$ is H or —$CH_3$. Component (c) is present in the first stage polymer at from about 0.1% to about 10% by weight, preferably from about 0.5% to about 10% by weight, more preferably from about 0.5% to about 0.8% by weight. Preferred monomers are allyl(meth)acrylate, N-methyloyl(meth)acrylamide, and the ethoxylated monomers. In the ethoxylated monomers, preferably subscript a is from about 4 to about 10.

The first emulsion polymerization yields a first polymer also denoted herein as first stage polymer or emulsion 1. The first stage polymerization is conducted to a high conversion before the second polymerization is initiated. Typically for the second stage polymerization a pre-emulsion mixture of components is prepared, and added to the resulting polymer from the first stage polymerization. Thus the second polymerization is conducted in the presence of the first polymer.

A second polymerization further comprises (d) one or more fluorinated(meth)acrylate monomers of the formula (II) $R_f^1$-L-X—C(O)—C(R)=$CH_2$, (e) one or more monomers of an alkyl(meth)acrylate, and (f) one or more monomers selected from the group consisting of N-methyloyl(meth) acrylamide and monomers of formula (I) as described above. In the product polymer the first stage polymer comprises from about 20% to about 75% by weight of the polymer. The polymerization is conducted in a solvent, optionally in the presence of a surfactant.

Component (d) in the second stage polymerizatiin is a fluorinated monomer of formula (II)

  (II)

wherein $R_f^1$ is a monovalent, partially or fully fluorinated, linear or branched, alkyl radical having 2 to about 100 carbon atoms; optionally interrupted by 1 to about 50 oxygen atoms; wherein the ratio of carbon atoms to oxygen atoms is at least 2:1 and no oxygen atoms are bonded to each other; L is a bond or a linear or branched divalent linking group having 1 to about 20 carbon atoms, said linking group optionally interrupted by 1 to about 4 hetero-radicals selected from the group consisting of —O—, —$NR^6$—, —S—, —SO—, —$SO_2$—, and —N($R^6$)C(O)— wherein $R^6$ is H or $C_1$ to $C_6$ alkyl, and said linking group optionally substituted with $CH_2Cl$; X is selected from the group consisting of —O—, —N(R)—, and —S—; wherein R is H, Cl, F or $CH_3$.

Preferred $R_f^1$ groups include
$F(CF_2)_n$, $F(CF_2)_nO(CF_2)_n$, $F(CF_2)_nOCFHCF_2$, or
$F(CF_2)_n[OCF_2CF(CF_3)]_p[OCF_2CF_2]_q$, wherein n is 1 to about 6; x is 1 to about 6; and p, q, and m are each independently 1 to about 3.

Preferred L is a bond, $R^5$, $R^6$-A, A, or ethylene oxide, wherein A is $C_1$-$C_6$ alkyl and $R^5$ is a divalent radical selected from the group consisting of —S($CH_2$)$_u$—,

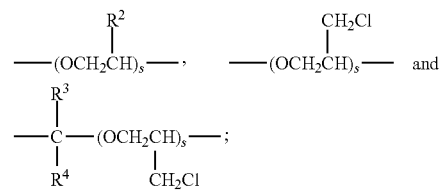

u is an integer of from about 2 to about 4;
s is an integer of 1 to about 50; and
$R^2$, $R^3$, and $R^4$ are each independently hydrogen or an alkyl group containing 1 to about 6 carbon atoms.

Preferably the monomers (II) are selected from the group consisting of formulas (IIa), (IIb), (IIc) and (IId):

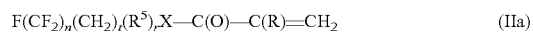  (IIa)

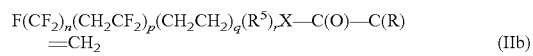  (IIb)

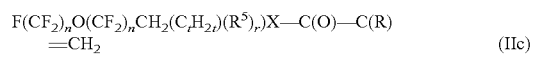  (IIc)

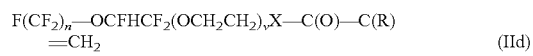  (IId)

wherein
X is —O—, —$NR^1$—; or —S—;
n is an integer of 1 to about 6;
t is an integer of 1 to about 10;
x is an integer of 1 to about 6;
p, q, and m are each independently an integer of 1 to about 3;
r is 0 or 1;
v is an integer of 1 to about 4;
$R^5$ is a divalent radical selected from the group consisting of —S($CH_2$)$_u$—,

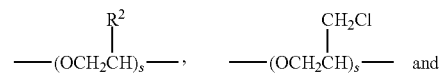

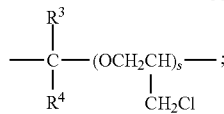

u is an integer of from about 2 to about 4;
s is an integer of 1 to about 50; and
$R^2$, $R^3$, and $R^4$ are each independently hydrogen or an alkyl group containing 1 to about 6 carbon atoms.

The fluorinated component (d) is present in the second polymerization at from about 70% to about 90% by weight of the second polymer, preferably from about 75% to about 90% by weight, more preferably from about 75% to about 80% by weight.

The fluorinated acrylates and fluorinated thioacrylates of formula (IIa), (IIb), (IIc) and (IId), wherein X is O or S useful in forming the compositions of the invention are prepared from the corresponding fluorinated alcohols and fluorinated thiols by esterification with acrylic acid, methacrylic acid, 2-chloroacrylic acid or 2-fluoroacrylic acid using procedures as described in U.S. Pat. No. 3,282,905 and European Patent Application 1632542 A1. Alternatively, acrylate and methacrylate esters of formula (IIa), (IIb), (IIc) and (IId) can be made from the corresponding nitrate esters according to the procedures disclosed in U.S. Pat. No. 3,890,376.

The fluorinated acrylamides of formula (IIa), (IIb), (IIc) and (IId), wherein X=—N(R)— useful in forming the compositions of the invention, are prepared from the corresponding fluorinated amines by condensation with acrylic acid chloride, methacrylic acid chloride, 2-chloroacrylic acid chloride or 2-fluoroacrylic acid chloride in the presence of a base, for instance, triethylamine (TEA). Typically a nonhydroxylic hydrocarbon solvent such as toluene or xylenes or a halocarbon such as dichloromethane is used in the condensation.

Fluorinated alcohols or thiols useful in forming the fluorinated acrylates suitable for use in the present invention include those of formulas (IIIa), (IIIb), (IIIc), and (IIId):

(IIIa)

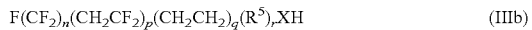
(IIIb)

(IIIc)

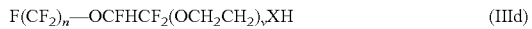
(IIId)

wherein
n, p, q, t, $R^1$, X, and v are as disclosed above.

In formula (IIIa) the perfluoroalkyl group preferably is linear, although compositions containing branched-chain perfluoroalkyl groups are suitable. Fluorinated alcohols useful in the preparation of formula (IIa), where and X is O, useful in this invention are available from E. I. DuPont de Nemours and Company Inc., Wilmington, Del. 19898 USA. A mixture of fluorinated alcohols can be used in the formation of perfluorinated alcohols of formula (IIa). For instance, a perfluoroalkylethyl alcohol mixture of the formula $F(CF_2)_n(CH_2)_tOH$, wherein n ranged from 1 to 6 and t is 2, or a purified fraction can be used. The perfluoroalkyl ethanols, wherein t is 2, and n is 4 or 6, are available by fractional distillation of the commercially available telomer mixture of perfluoroalkylethanols. Specific fluorinated alcohols of formula (IIIa) that are commercially available include 1H,1H, 2H,2H-perfluoro-1-hexanol, 1H,1H,-perfluoro-1-hexanol, and 1H,1H,2H,2H-perfluoro-1-octanol.

Fluorinated telomer alcohols of formula (IIIb) useful in the present invention, wherein $R_f^1$ is a linear or branched perfluoroalkyl group having 1 to 6 carbon atoms and X is O, are available by synthesis. The telomerization of vinylidene fluoride (VDF) with linear or branched perfluoroalkyl iodides is well known, and produces compounds of the structure $R_f^1(CH_2CF_2)_pI$, wherein p is 1 or more and $R_f^1$ is a $F(CF_2)_n$, wherein n is 1 to 6, preferably n is 4 or 6. For example, see Balague, et al, "Synthesis of fluorinated telomers, Part 1, Telomerization of vinylidene fluoride with perfluoroalkyl iodides", J. Flour Chem. (1995), 70(2), 215-23. The specific telomer iodides are isolated by fractional distillation. The telomer iodides can be treated with ethylene by procedures described in U.S. Pat. No. 3,979,469, to provide the telomer ethylene iodides $R_f^1(CH_2CF_2)_p(CH_2CH_2)_qI$ wherein q is 1 to 3 or more. The telomer ethylene iodides can be treated with oleum and hydrolyzed to provide the corresponding telomer alcohols (IIIb) according to procedures disclosed in WO 95/11877. Alternatively, the telomer ethylene iodides can be treated with N-methyl formamide followed by ethyl alcohol/acid hydrolysis.

Specific fluorinated telomer alcohols (IIIa), and (IIIb) derived from telomerization of vinylidene fluoride and ethylene, and useful in forming fluorinated acrylates useful in the invention include, but not limited to, $C_4F_9CH_2CH_2OH$, $C_4F_9(CH_2CH_2)_2OH$, $C_6F_{13}CH_2CH_2OH$, $C_6F_{13}(CH_2CH_2)_2OH$, $C_6F_{13}(CH_2CH_2)_3OH$, $C_4F_9CH_2CF_2CH_2CH_2OH$, $C_4F_9(CH_2CF_2)_2CH_2CH_2OH$, $C_4F_9(CH_2CF_2)_3CH_2CH_2OH$, $C_4F_9CH_2CF_2(CH_2CH_2)_2OH$, $C_4F_9(CH_2CF_2)_2(CH_2CH_2)_2OH$, $C_6F_{13}CH_2CF_2CH_2CH_2OH$, $C_6F_{13}(CH_2CF_2)_2CH_2CH_2OH$, $C_6F_{13}(CH_2CF_2)_3CH_2CH_2OH$, $C_6F_{13}CH_2CF_2(CH_2CH_2)_2OH$, $C_6F_{13}(CH_2CF_2)_2(CH_2CH_2)_2OH$. The groups $C_3F_7$, $C_4F_9$, and $C_6F_{13}$, referred to in the list of specific alcohols, and in the examples herein, refer to linear perfluoroalkyl groups unless specifically indicated otherwise.

Fluorinated alcohols of formula (IIIc), wherein p is 1 and $R_f^1$ is a linear or branched perfluoroalkyl group having 1 to 6 carbon atoms and X is O, are available by synthesis. Perfluoroalkyl ether iodides, for example $F(CF_2)_nOCF_2CF_2I$, are made by the procedure described in Example 8 of U.S. Pat. No. 5,481,028, using perfluoroalkyl vinyl ethers as a starting point. In the second reaction, the perfluoroalkyl ether iodide is reacted with an excess of ethylene at an elevated temperature and pressure to provide telomer ethyl iodide, $F(CF_2)_nOCF_2CF_2(CH_2CH_2)_qI$. While the addition of ethylene can be carried out thermally, the use of a suitable catalyst is preferred. Preferably the catalyst is a peroxide catalyst such as benzoyl peroxide, isobutyroyl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time may vary with the catalyst and reaction conditions, but we have found 24 hours (h) to be adequate. The product can be purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 h, and purifying the product by distillation. The perfluoroalkylether ethyl iodides can be treated with oleum and hydrolyzed to provide the corresponding alcohols, for example $F(CF_2)_nOCF_2CF_2(CH_2CH_2)_qOH$, according to procedures disclosed in WO 95/11877. Alternatively, the perfluoroalkylether ethyl iodides can be treated with N-methyl formamide followed by ethyl alcohol/acid hydrolysis.

The higher homologs of (IIIc) wherein p is 2 or 3 are available by telomerization of tetrafluoroethylene with the perfluoroalkyl ether iodides (XI) wherein p is 1, followed by isolation of specific telomers by distillation, and then telomerization with ethylene. The higher homologs (q is 2 or 3) of telomer ethylene iodides are available with excess ethylene at high pressure.

Specific fluorinated alcohols of formula (IIIc) useful in the invention include, but limited to, $C_2F_5OCF_2CF_2CH_2CH_2OH$, $C_2F_5O(CF_2CF_2)_2CH_2CH_2OH$, $C_3F_7OCF_2CF_2CH_2CH_2OH$, $C_3F_7O(CF_2CF_2)_2CH_2CH_2OH$, $C_4F_9OCF_2CF_2CH_2CH_2OH$, $C_4F_9O(CF_2CF_2)_2CH_2CH_2OH$, $C_6F_{13}OCF_2CF_2CH_2CH_2OH$, $C_6F_{13}O(CF_2CF_2)_2CH_2CH_2OH$.

Fluorinated alcohols of formula (IIId) useful in the present invention, wherein v is 1 to about 4 and $R_f^1$ is a linear or branched perfluoroalkyl group having 1 to 6 carbon atoms and X is O, are available by synthesis. Compounds of formula (IIIe) are prepared by the reaction of a perfluoroalkyl vinyl ether with a diol in the presence of an alkali metal compound. Preferred ethers include those of formula $F(CF_2)_nOCF=CF_2$ wherein n is one to six carbons. Preferred diols include diethylene glycol. The diol is used at about 1 to about 15 mols per mol of ether, preferably from about 1 to about 5 mols per mol of ether. Suitable alkali metal compounds include an alkali metal, alkali earth metal, alkali hydroxide, alkali hydride, or an alkali amide. Preferred are alkali metals such as Na, K or Cs or alkali hydrides such as NaH or KH. The reaction is conducted at a temperature of from about ambient temperature to about 120° C., preferably from about 40° C. to about 120° C. The reaction can be conducted in an optional solvent, such as ether or nitrile.

The corresponding thiols of the alcohols of formulas (IIIa) (IIIb), (IIIc) and (IIId), wherein X is S, are available from the fluorinated iodides compounds by treatment with a variety of reagents according to procedures described in J. Fluorine Chemistry, 104, 2 173-183 (2000). One example is the reaction of the telomer ethylene iodides with sodium thioacetate, followed by hydrolysis.

One preferred embodiment is a composition of the invention, as disclosed above, wherein formula (II) is formula (IIa); further wherein $F(CF_2)_n$ is $C_4$ to $C_6$ perfluoroalkyl group, and further wherein X is O.

Another preferred embodiment is a composition of the invention, as disclosed above, wherein formula (II) is formula (IIb); preferably wherein $F(CF_2)_n$ is $C_4$ to $C_6$ perfluoroalkyl group; more preferably wherein p and q are 1; and more preferably wherein X is O.

Another preferred embodiment is a composition of the invention, as disclosed above, wherein formula (II) is formula (IIc); and further wherein subscript n is 2 to 6 perfluoroalkylether group; and preferably wherein X is O.

Another preferred embodiment is a composition of the invention, as disclosed above, wherein formula (II) is formula (IId); and further wherein $F(CF_2)_n$ is $C_4$ to $C_6$ perfluoroalkylether group; and preferably wherein X is O.

The second component (e) employed in the second stage polymerization is from about 10% to 30% by weight of one or more monomers of $C_1$ to $C_{18}$, straight, branched, or cyclic alkyl(meth)acrylate. Preferably the proportion of component (e) is from about 15% to about 25% by weight, more preferably from about 18% to about 23% by weight. Specific alkyl (meth)acrylates useful in component (e) are the same as those previously listed above for component (b).

The third component (f) employed in the second polymerization is from about 0.1% to about 10.0% by weight of one or more monomers selected from the group consisting of N-methylol(meth)acrylamide and monomers of formula (I)

$$R-(OCH_2CH_2)_a-O-C(O)-C(R^1)=CH_2 \qquad (I)$$

wherein R is hydrogen, $C_1$-$C_4$ alkyl, or $-C(O)-C(R^1)=CH_2$, and $R^1$ is H or $CH_3$ Preferably the proportion of component (f) is from about 0.5% to about 7% by weight, more preferably from about 1% to about 5% by weight. Specific preferred monomers for component (f) are the same as those described above for component (c).

The polymer of the present invention has a fluorine content of from about 0.1% to about 10%. Preferably the fluorine content is from about 0.5% to about 7%, more preferably from about 0.5% to about 5%, and more preferably from about 1% to about 5%, each based on a product of 25% solids.

The polymerization reactions used to prepare the polymer of the present invention are typically conducted in the presence of a surfactant. Cationic, anionic and nonionic surfactants useful in the present invention are any of those surfactants commonly used for preparing aqueous emulsions. Suitable cationic agents include, for example, dodecyltrimethylammonium acetate, trimethyltetradecylammonium chloride, hexadecyltrimethylammonium bromide, trimethyloctadecylammonium chloride, ethoxylated alkyl amine salts, and others. A preferred example of a suitable cationic surfactant is the methyl chloride salt of an ethoxylated alkyl amine salt such as an 18-carbon alkylamine with 15 moles of ethylene oxide such as ETHOQUAD 18/25 available from Akzo Nobel, Chicago, Ill. Nonionic surfactants which are suitable for use herein include condensation products of ethylene oxide with $C_{12}$ to $C_{18}$ fatty alcohols, $C_{12}$ to $C_{18}$ fatty acids, alkyl phenols having 8 to 18 carbon atoms in the alkyl group, $C_{12}$ to $C_{18}$ alkyl thiols and $C_{12}$ to $C_{18}$ alkyl amines. A preferred example of a suitable nonionic surfactant, if used in combination with the cationic surfactant, is an ethoxylated tridecyl alcohol surfactant such as MERPOL SE available from Stepan Company, Northfield, Ill. Suitable anionic surfactants which are used herein include alkyl carboxylic acids and their salts, alkyl hydrogen sulfates and their salts, alkyl sulfonic acids and their salts, alkyl ethoxy sulfates and their salts, alpha olefin sulfonates, alkylamidoalkylene sulfonates, and the like. Generally preferred are those wherein the alkyl groups have 8 to 18 carbon atoms. Especially preferred is an alkyl sulfate sodium salt where the alkyl group averages about 12 carbons, such as SUPRALATE WAQE surfactant, available from Witco Corporation, Greenwich, Conn.

In addition to the above ingredients and water, the final emulsion polymer optionally contains auxiliary solvents such as tripropylene glycol, dipropylene glycol, 1,2-propanediol, hexylene glycol, propylene glycol, ethylene glycol, acetone and others. These may be present up to about 10% by weight, preferably between about 5% and about 10% by weight, of the wet emulsion.

Emulsion polymerization is employed to prepare the polymer of this invention. The process is carried out in two polymerization stages. The first polymerization provides a first polymer (emulsion 1). The process is carried out in a reaction vessel fitted with a stirrer and external means for either heating or cooling the charge. The monomers to be polymerized together are emulsified in an aqueous solution containing a suitable surfactant, and optionally an organic solvent, to provide an emulsion concentration of from about 5% to about 50% by weight. Usually the temperature is raised to about 40° C. to about 70° C. to effect polymerization in the presence of an added catalyst. A suitable catalyst is any of the commonly known agents for initiating the polymerization of an ethylenically unsaturated compound. Such commonly employed initiators include 2,2'-azodi-isobutyramidine dihydrochloride; 2,2'-azodiisobutyro-nitrile; 2,2'-azobis(2-methylpropionamidine)dihydrochloride and 2,2' azobis(2,4-dimethyl-4-methoxyvaleronitrile. The concentration of added initiator is usually 0.1 to about 2% by weight, based on the weight of the monomers to be polymerized. To control the molecular weight of the resulting polymer, small amounts of a chain-transfer agent, such as an alkylthiol of 4 to about 18 carbon atoms, is optionally present during polymerization. In the second stage of the polymerization, a second polymer emulsion is formed. The components of the second polymer are added to the same reactor containing the first polymer emulsion. The monomers to be polymerized in the second polymerization are emulsified in an aqueous solution containing a suitable surfactant, and optionally an organic solvent, to provide a pre-polymer emulsion concentration of from about 5% to about 50% by weight (emulsion 2 in the examples herein). This emulsion is added to the first polymer and polymerization is initiated, usually at a temperature of about 40° C. to about 70° C., in the presence of an added catalyst, as described for the first polymerization.

After the second stage polymerization is complete, either an anionic or cationic surfactant is added to the emulsion. If an anionic surfactant is used during polymerization, a cationic surfactant is added after polymerization. If a cationic surfactant is used during polymerization, an anionic surfactant is added after polymerization. Both an anionic and cationic surfactant are present in the emulsions of the present invention in order to achieve the zeta potential desired for a particular application, and to have the desired chemical and mechanical stability under conditions of high alkalinity, high anionic concentration, or high shear during use of the emulsion.

The polymer of the present invention can further comprise optional components. An example of an optional component includes 2-hydroxyethyl(meth)acrylate(2-propenoic acid, 2-methyl-, 2-hyroxyethyl ester), useful for the purpose of enhancing emulsion stability, increasing crosslinking, and increasing attachment to the substrate thereby aiding in durability. Other examples of optional components include an alkane thiol for use as a chain transfer agent, or a glycol co-solvent such as propylene glycol or dipropylene glycol which may aid in stabilizing the final emulsion. The optional component is present at 0% to about 2% by weight of the first polymer, or of the second polymer, or both polymers.

In another embodiment, the composition of the invention can further include other additives commonly used with such polymer treating agents such as pH adjusters, cross linkers, wetting agents, blocked isocyanates, wax extenders, and other additives known by those skilled in the art. Examples of such finishes or agents include processing aids, foaming agents, lubricants, anti-stains, and the like. In particular for fibrous substrates, when synthetic or cotton fabrics are treated, a wetting agent can be used, such as ALKANOL 6112 available from E. I. du Pont de Nemours and Company, Wilmington, Del. When cotton or cotton-blended fabrics are treated, a wrinkle-resistant resin can be used such as PERMAFRESH EPC available from Omnova Solutions, Chester, S.C.

When used for treating fibrous substrates the polymer of the present invention can be blended with other surface treatment agents for simultaneous application to the substrate, or can be applied in a tandem manner with other surface treatment agents. Examples of such other treatment agents are those that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, cleanability and similar effects.

The present invention further comprises a method of treating fibrous substrates to impart oil repellency, water repellency, and dynamic water repellency comprising contacting the surface of the substrate with a polymer of the invention as described above. The polymer of this invention in the form of an aqueous emulsion is contacted directly with a substrate to be rendered oil- and water-repellent. The emulsion of this invention is applied alone or in admixture with dilute nonfluorinated polymers, or with other textile treatment agents or finishes. The composition can be applied at a manufacturing facility, retailer location, or prior to installation and use, or at a consumer location.

Fibrous substrates suitable for practicing the method of the invention include those as described below. The emulsion polymers of this invention are generally applied to fibrous substrates by spraying, dipping, padding, or other well-known methods. The emulsions of the invention are generally diluted with water to concentrations of from about 5 g/L to about 100 g/L, preferably from about 10 g/L to about 50 g/L, based upon the weight of the fully formulated emulsion. After excess liquid has been removed, for example by squeeze rolls, the treated fabric is dried and then cured by heating, for example, to 110° C. to 190° C., for at least 30 seconds, typically 60-180 seconds. Such curing enhances repellency and durability. While these curing conditions are typical, some commercial apparatus may operate outside these ranges because of its specific design features.

The present invention further comprises a fibrous substrate having applied to its surface a polymer of the invention as previously described. Preferably the treated substrate has a fluorine content of from about 0.05% by weight to about 0.5% by weight, more preferably from about 0.1% to about 0.4%.

Suitable substrates include fibrous substrates. The fibrous substrates include woven and nonwoven fibers, yarns, fabrics, fabric blends, textiles, nonwovens, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically, these blends are a combination of at least one natural fiber and at least one synthetic fiber, but also can include a blend of two or more natural fibers or of two or more synthetic fibers. Carpet substrates can be dyed, pigmented, printed, or undyed. Fibers and yarns in the carpet substrates may be dyed, pigmented, printed, or undyed. Carpet substrates can be scoured or unscoured. Substrates to which it is particularly advantageous to apply the polymer of the present invention so as to impart repellency properties include polyamide (such as nylon) polyester, cotton, and blends of polyester and cotton. The nonwoven substrates include, for example, spunlaced nonwovens, such as SONTARA available from E. I. du Pont de Nemours and Company, Wilmington, Del., and spunbonded-meltblown-spunbonded (SPS) nonwovens.

The emulsions of this invention are useful in rendering the substrate surface repellent to oil and water. The repellency is durable after multiple launderings. The presence of the particles aids in boosting durability over many (up to about 20) launderings. The polymer emulsions of the present invention also have the advantage of providing such repellency while containing short chain perfluoroalkyl groups having from about 2 to about 7 carbon atoms. Thus the polymers of the present invention provide fluorine efficiency compared to conventional treating agents containing longer chain perfluoroalkyls. The emulsions of the present invention are advantageous in that they can be used under a wide variety of application conditions due to their stability. The treated substrates of the present invention are useful in a variety of applications and products such as clothing, protective garments, carpet, upholstery, furnishings, and other uses. The excellent surface properties described above help to maintain surface cleanliness and therefore can permit longer use.

Test Methods and Materials

The following testing procedures were used in the Examples.

Test Method 1—Fabric Treatment

The fabric treated in this study used was 100% by weight White Cotton

Twill available from SDL Atlas Textile Testing Solutions, Rock Hill, S.C. 29732. The fabric was treated with the aqueous dispersion of the 2-stage emulsion polymer using a conventional pad bath (dipping) process. The prepared concentrated dispersion of the polymer emulsions of the invention were diluted with deionized water to achieve a pad bath having 3 to 10% by weight of the final emulsion in the bath to achieve a weight percent fluorine as designated in the Examples. The concentration of fluoropolymer was 5% by weight in the pad bath for the examples herein. A wetting agent, INVADINE PBN, a cross-linking agent, KNITTEX FEL and a textile finishing agent, KNITTEX Catalyst MO. (all available from Huntsman, High Point, N.C., USA) were also included in the bath at 0.5, 3.0 and 0.9% by weight respectively. The fabric was padded in the bath, and the excess liquid removed by squeeze rollers. The wet pickup was around 80% to 90% on the cotton substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.

Test Method 2—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 2A. Ratings of 0.5 increments are determined by subtracting one half from the numbers in Table 1 for borderline passing of the test liquid.

TABLE 2A

| Standard Test Liquids | | |
| --- | --- | --- |
| Water Repellency Rating | Volume % Isopropyl Alcohol | Volume % Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

TABLE 2A-continued

| Standard Test Liquids | | |
| --- | --- | --- |
| Water Repellency Rating | Volume % Isopropyl Alcohol | Volume % Distilled Water |
| 9 | 70 | 30 |
| 10 | 80 | 20 |
| 11 | 90 | 10 |
| 12 | 100 | 0 |

Test Method 3—Water Repellency—Spray Rating

Water repellency was further tested by utilizing the spray test method which is a measure of dynamic water repellency. The treated fabric samples were tested for water repellency by following the AATCC standard Test Method No. 22-1996, conducted as follows: A fabric sample, treated with an aqueous dispersion of polymer as previously described, was conditioned for a minimum of 4 hours at 23° C.+65% relative humidity prior to testing. The fabric sample was securely fastened on a plastic/metal embroidery hoop such that the fabric was wrinkle-free. The hoop was placed on the testing stand so that the fabric was facing up. Then 250 mL of water at 80±2° F. (27±1° C.) was poured into the testing funnel allowing the water to spray onto the fabric surface. Once the water had run through the funnel, the hoop was rapped against the edge of a solid object with the fabric facing down, rotated 180 degrees and rapped again. The spotted or wetted surface was compared with the AATCC standards found in the AATCC Technical Manual. The more wet the surface, the lower the number and the poorer the repellency. A 100 denoted no wetting, a 90 denoted slight wetting (three small spots), an 80 denoted wetting signified by several (10) spots at the spray points, a 70 denoted partial wetting of the upper fabric surface, a 50 denoted wetting of the entire upper fabric surface, and a 0 denoted complete wetting of the lower and upper fabric surface. A rating of 15, 25, 35, 45, 55, 60, 65, 75 or 85 indicated performance intermediate between the above-described rankings Overall a higher number indicated better repellency.

Test Method 4—Oil Repellency

The treated fabric samples were tested for oil repellency by a modification of AATCC standard Test Method No. 118, conducted as follows: A fabric sample, treated with an aqueous dispersion of polymer as previously described, was conditioned for a minimum of 4 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. In general, treated fabrics with a rating of 6 or more were considered good to excellent; fabrics with a rating of 5 or more were considered acceptable; fabrics having a rating of one or greater can be used in certain applications. Ratings of 0.5 increments were determined by subtracting one-half from the number in Table 2B for borderline passing of the next liquid.

TABLE 2B

Oil Repellency Test Liquids

| Oil Repellency Rating | Test Solution |
| --- | --- |
| 1 | NUJOL Purified Mineral Oil |
| 2 | 65/35 Nujol/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 s at 38° C. and a specific gravity of 0.880/0.900 g/cm³ at 15° C.

Test Method 5—Wash Durability

The fabric samples were laundered according to International Standard specified domestic washing procedure for textile testing. Fabric samples were loaded into a horizontal drum, front-loading type (Type A, WASCATOR FOM 71MP-Lab) of automatic washing machine with a ballast load to give a total dry load of 4 lb. A commercial detergent was added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast were washed a designated number of times (5 HW for 5 washes, 20 HW for 20 washes etc.). After washing was complete, the wet fabric samples were dried in air, then ironed with a flatbed press at a surface temperature of 135 to 160° C., 30 seconds on each side.

Materials

The following materials were used in the Examples.

VP R825 (Silane, trimethoxyoctyl-, hydrolysis product with silica) is commercially available from Degussa, Düsseldorf, Germany, now Evonik Industries, Essen, Germany.

ARMEEN DM 18D (N,N-Dimethyloctadecylamine) and ETHOQUAD 18/25 (Poly(oxy-1,2-ethanediyl),a,a'-[(methyloctadecyliminio)di-2,1-ethanediyl]bis[chloride]) are commercially available from Akzo Nobel, Chicago, Ill.

ETHAL TDA-5(Polyoxyethylene tridecylether) is commercially available from Ethox Chemicals, LLC., Greenville, S.C.

VAZO 56 (Propanimidamide, 2,2'-(1,2-diazenediyl)bis[2-methyl-, dihydrochloride] is commercially available from E. I. du Pont de Nemours and Company, Wilmington, Del.

The following are each commercially available from Aldrich Chemical Co. Milwaukee, Wis., and may be denoted in the Examples by the abbreviations or names indicated:

WAQE is Sodium lauryl sulfate,

2-EHMA is 2-Methyl-2-propenoic acid, 2-ethylhexyl ester or 2-ethylhexyl(meth)acrylate, SMA is 2-Propenoic acid, 2-methyl-, octadecyl ester, or stearyl(meth)acrylate, 7-EO MA is Poly(oxy-1,2-ethanediyl), α-(2-methyl-1-oxo-2-propenyl)-ω-hydroxy-), or 7EO-(meth)acrylate, MAM is 2-Propenamide, N-(Hydroxymethyl)-, or N-methylol meth)acrylamide, HEMA is 2-Propenoic acid, 2-methyl-, 2-hydroxyethyl ester, or 2-hydroxyethyl(meth)acrylate, DDM is 1-Dodecanethiol, DPG is Dipropylene glycol, and PPG is Propylene glycol.

EXAMPLES

Example 1

A first-stage polymer emulsion composition was prepared by dispersing through sonication hydrophobized inorganic oxide particles (0.40 g, VP R825) in 2-methyl-2-propenoic acid, 2-ethylhexyl ester (12.20 g) in a plastic beaker. Water (14 g); ARMEEN DM 18 D (0.4 g); poly(oxy-1,2-ethanediyl), α-(2-methyl-1-oxo-2-propenyl)-ω-hydroxy-) (1.75 g); 2-propenamide, N-(hydroxymethyl)-(0.24 g); 1-dodecanethiol (0.05 g); propylene glycol (3.5 g); sodium chloride (0.07 g, 2% w/w in water); and acetic acid (0.2 g) were then also added to the plastic beaker and sonified to form the stage 1 pre-emulsion. The beaker contents were transferred to a round bottom flask that was equipped with a nitrogen purge, an overhead mechanical stirrer, a heating mantle, and a temperature probe. Water (5 g) was used to rinse the beaker and the water rinse was then added to the round bottom flask. The pre-emulsion was stirred and sparged with nitrogen for 30 minutes followed by the addition of a free-radical initiator VAZO-56 (0.09 g in 4.75 g water). The temperature was then increased to 65° C. (149° F.) and held for 1 hr under a nitrogen atmosphere. This resulted in the formation of the stage 1 emulsion.

Thereafter, a separate pre-emulsion was prepared in a plastic beaker by sonifying a mixture of: deionized water (12.3 g); ETHAL TDA-5 (0.59 g); ETHOQUAD 18/25 (2.1 g, 20% solution); $F(CF_2)_6CH_2CH_2OC(O)C(CH_3)=CH_2$ (8.85 g, available from E. I. du Pont de Nemours and Company, Wilmington, Del.); poly(oxy-1,2-ethanediyl), α-(2-methyl-1-oxo-2-propenyl)-ω-hydroxy-) (0.17 g); 2-propenoic acid, 2-methyl-, octadecyl ester (2.1 g); 2-propenamide, N-(hydroxymethyl)- (0.2 g); 2-propenoic acid, 2-methyl-, 2-hydroxyethyl ester (0.09 g); 1-dodecanethiol (0.05 g); and dipropylene glycol (2.5 g).

The separate pre-emulsion was then added to the round bottom flask containing the stage 1 emulsion. The mixture was then purged with nitrogen for 30 minutes followed by the addition of a free-radical initiator (0.05 g VAZO-56 in 4.5 g water). The flask remained at 65° C. for an additional 4 hours after which it was cooled to room temperature. Sodium lauryl sulfate (0.05 g) surfactant in water (15.0 g) was then added. Finally, the resulting solution/mixture was gravity filtered using a milk filter and diluted to 25% solids. The product contained 4.86% fluorine. The product was applied to fabric using Test Method 1 to achieve 1900 micrgrams per gram fluorine on the fabric, and was tested for repellency and durability using Test Methods 2 to 5. The results are in Table 3.

Comparative Example A

The process of Example 1 was repeated, with the exception that the particle was not included in the preparation of the first-stage emulsion. The product was applied to fabric using Test Method 1 to achieve 1900 micrgrams per gram fluorine on the fabric, and was tested for repellency and durability using Test Methods 2 to 5. The results are in Table 3.

Example 2

Ethylene (56 g) was introduced to an autoclave charged with $CF_3(CF_2)_3(CH_2CF_2)_2I$ (714 g) and d-(+)-limonene (3.2 g), and the reactor heated at 240° C. for 12 hours. The product was isolated by vacuum distillation to provide $CF_3(CF_2)_3$ $(CH_2CF_2)_2CH_2CH_2I$. A mixture of $CF_3(CF_2)_3(CH_2CF_2)_2$ $CH_2CH_2I$ (10 g, 0.02 mol) and N-methylformamide (8.9 mL, 0.15 mol) was heated to 150° C. for 26 hours. The mixture was cooled to 100° C., followed by the addition of water to separate the crude ester. Ethyl alcohol (3 mL) and p-toluene sulfonic acid (0.09 g) were added and the mixture stirred at 70° C. for 0.25 hours. Ethyl formate and ethyl alcohol were removed by distillation to give a crude product. The crude product was dissolved in ether, washed with 10 wt % aqueous sodium sulfite, water and brine, in turn, and dried over magnesium sulfate. Distillation provided the alcohol product, $CF_3$ $(CF_2)_3(CH_2CF_2)_2CH_2CH_2OH$, (6.5 g, 83% yield): bp 94-95° C. at 2 mm Hg (266 Pascals).

The previously prepared alcohol (400 g) and cyclohexane (308.6 g) were added to a round bottomed flask equipped with a stir bar, a Dean-Stark trap and an addition funnel. p-Toluenesulfonic acid monohydrate (9.2 g) and 4-methoxyphenol (1.4 g) was charge separately to the flask, while the flask was being heated. When the temperature reached 70° C., methacrylic acid (130.4 g) was added dropwise. After all of the methacrylic acid was added, the flask was insulated and the flask temperature was raised to 85° C. Reaction was monitored by GC for formation of $CF_3(CF_2)_3$ $CH_2CF_2CH_2CF_2CH_2CH_2O—C(O)—C(CH_3)=CH_2$ (PPVE-methacrylate). Once all of the alcohol had reacted, the flask was cooled to room temperature. The mixture was then transferred to a separation funnel. The flask was rinsed with ethyl ether, and the ethyl ether wash was then added to the mixture in separation funnel. The reaction mixture was washed three times with sodium bicarbonate (150 mL, 10% w/w solution) and ice and the aqueous layer was removed each time. The reaction mixture was then washed with deionized water (150 mL), and the aqueous layer was removed. An aliquot of the reaction mixture was taken and analyzed by GC to ensure all unreacted methacrylic acid was removed during the washes. The reaction mixture was transferred to a round bottom flask and magnesium sulfate was added to dry the reaction mixture. The reaction mixture was then filtered and the filtered solids were washed with ethyl ether. The reaction mixture was dried over $MgSO_4$, filtered, and concentrated in vacuo on a rotary evaporator at high vacuum to give a liquid (10.1 g). Analysis by GC and NMR revealed the reaction mixture was $CF_3(CF_2)_3CH_2CF_2CH_2CF_2CH_2CH_2O—C$ $(O)—C(CH_3)=CH_2$.

A first-stage polymer emulsion composition was prepared by dispersing through sonication hydrophobized inorganic oxide particles (0.20 g, VP R825) in 2-methyl-2-propenoic acid, 2-ethylhexyl ester (12.20 g) in a plastic beaker. Water (14 g); ARMEEN DM 18 D (0.4 g); poly(oxy-1,2-ethanediyl), α-(2-methyl-1-oxo-2-propenyl)-ω-hydroxy-) (1.75 g); 2-propenamide, N-(hydroxymethyl)- (0.24 g); 1-dodecanethiol (0.05 g); propylene glycol (3.5 g), sodium chloride (0.07 g, 2% w/w in water), acetic acid (0.2 g) were then also added to the plastic beaker and sonified to form the stage 1 pre-emulsion. The beaker contents were transferred to a round bottom flask that was equipped with a nitrogen purge, an overhead mechanical stirrer, a heating mantle, and a temperature probe. Water (5 g) was used to rinse the beaker and the water rinse was then added to the round bottom flask. The pre-emulsion was stirred and sparged with nitrogen for 30 minutes followed by the addition of a free-radical initiator VAZO-56 (0.09 g in 4.75 g water). The temperature was then increased to 65° C. (149° F.) and held for 1 hr under a nitrogen atmosphere. This resulted in the formation of the stage 1 emulsion.

Thereafter, a separate pre-emulsion was prepared in a plastic beaker by sonifying a mixture of: deionized water (12.3 g); ETHAL TDA-5 (0.59 g); ETHOQUAD 18/25 (2.1 g, 20% solution); $F(CF_2)_4(CH_2CF_2)_2CH_2CH_2OC(O)—C(CH_3)=CH_2$ (6.59 g, available from E. I. du Pont de Nemours and Company, Wilmington, Del.); poly(oxy-1,2-ethanediyl), α-(2-methyl-1-oxo-2-propenyl)-ω-hydroxy-) (0.17 g); 2-propenoic acid, 2-methyl-, octadecyl ester (2.1 g); 2-propenamide, N-(hydroxymethyl)- (0.2 g); 2-propenoic acid, 2-methyl-, 2-hydroxyethyl ester (0.09 g); 1-dodecanethiol (0.05 g); and dipropylene glycol (2.5 g). The separate pre-emulsion was then added to the round bottom flask containing the stage 1 emulsion. The mixture was then purged with nitrogen for 30 minutes followed by the addition of a free-radical initiator VAZO-56 (0.05 g in 4.5 g water). The flask remained at 65° C. for an additional 4 hours after which it was cooled to room temperature. Sodium lauryl sulfate (0.05 g) surfactant in water (15.0 g) was then added. Finally, the resulting solution/mixture was gravity filtered using a milk filter and diluted to 25% solids. The product contained 4.8% fluorine. The product was applied to fabric using Test Method 1 to achieve 1900 micrgrams per gram fluorine on the fabric, and was tested for repellency and durability using Test Methods 2 to 5. The results are in Table 3.

Comparative Example B

The process of Example 2 was repeated, with the exception that the particle was not included in the preparation of the first-stage emulsion. The product was applied to fabric using Test Method 1 to achieve 1900 micrgrams per gram fluorine on the fabric, and was tested for repellency and durability using Test Methods 2 to 5. The results are in Table 3.

Example 3

A perfluoropropylvinyl ether $CF_3(CF_2)_2$ $CHFCF_2CH_2CH_2OH$) alcohol was prepared for use in Example 3 as follows. In a dry box, a 500 mL Pyrex bottle was charged with diethylene glycol (175 mL, 99%, commercially available from Aldrich Chemical Company, Milwaukee, Wis.) and 80 mL of anhydrous tetrahydrofuran. Sodium hydride (3.90 g) was added slowly with magnetic stirring until the completion of hydrogen evolution. The capped bottle was removed from the drybox, and the solution was transferred to a 400 mL metal shaker tube in a nitrogen filled glovebag. The shaker tube was cooled to an internal temperature of −18° C., shaking was started, and perfluoropropylvinyl ether (41 g) was added from a metal cylinder. The mixture was allowed to warm to room temperature and was shaken for 20 h. The reaction mixture was combined with a duplicate reaction run in a separate 400 mL shaker tube. The combined reaction mixtures were added to 600 mL of water, and this mixture was extracted with 3×200 mL of diethyl ether in a separatory funnel. The ether extracts were dried over $MgSO_4$, filtered, and concentrated in vacuo on a rotary evaporator to give a liquid (119.0 g) 1H NMR in $CD_3OD$, and analysis by gas chromatography both showed a small amount of diethylene glycol. This material was dissolved in 150 mL of diethyl ether and extracted with water (3×150 mL) in a separatory funnel. The ether layer was dried over $MgSO_4$, filtered, and concentrated in vacuo on a rotary evaporator at high vacuum to give $CF_3(CF_2)_2CHFCF_2CH_2CH_2OH$ (99.1 g)

Perfluoropropylvinyl ether alcohol, $CF_3(CF_2)_2$ $OCHFCF_2—CH_2CH_2OH$, (400 g) and cyclohexane (308.6 g) were added to a round bottomed flask equipped with a stir bar, a Dean-Stark trap and an addition funnel. p-Toluenesulfonic acid monohydrate (9.2 g) and 4-methoxyphenol (1.4 g) was charge separately to the flask, while the flask was being heated. When the temperature reached 70° C., methacrylic acid (130.4 g) is added dropwise. After all of the methacrylic acid was added, the flask was insulted and the flask temperature was raised to 85° C. Reaction was monitored by GC for formation of perfluoropropylvinyl ether methacrylate. Once all of the perfluoropropylvinyl ether alcohol had reacted, the flask was cooled to room temperature. The mixture was then transferred to a separation funnel. The flask was rinsed with ethyl ether, and the ethyl ether wash was then added to the mixture in separation funnel. The reaction mixture was washed three times with sodium bicarbonate (150 mL, 10% w/w solution) and ice and the aqueous layer was removed each time. The reaction mixture was then washed with deionized water (150 mL), and the aqueous layer was removed. An aliquot of the reaction mixture was taken and analyzed by GC to ensure all unreacted methacrylic acid was removed during the washes. The reaction mixture was transferred to a round bottom flask and magnesium sulfate was added to dry the reaction mixture. The reaction mixture was then filtered and the filtered solids were washed with ethyl ether. The reaction mixture was dried over $MgSO_4$, filtered, and concentrated in vacuo on a rotary evaporator at high vacuum to give a liquid (10.1 g). Analysis by GC revealed the reaction mixture was $CF_3(CF_2)_2OCHFCF_2CH_2CH_2O-C(O)-C(CH_3)=CH_2$.

A first-stage polymer emulsion composition was prepared by dispersing through sonication hydrophobized inorganic oxide particles (0.20 g, VP R825) in 2-methyl-2-propenoic acid, 2-ethylhexyl ester (12.20 g) in a plastic beaker. Water (14 g); ARMEEN DM 18 D (0.4 g); poly(oxy-1,2-ethanediyl), α-(2-methyl-1-oxo-2-propenyl)-ω-hydroxy-) (1.75 g); 2-propenamide, N-(hydroxymethyl)- (0.24 g); 1-dodecanethiol (0.05 g); propylene glycol (3.5 g); sodium chloride (0.07 g, 2% w/w in water); and acetic acid (0.2 g) were then also added to the plastic beaker and sonified to form the stage 1 pre-emulsion. The beaker contents were transferred to a round bottom flask that was equipped with a nitrogen purge, an overhead mechanical stirrer, a heating mantle, and a temperature probe. Water (5 g) was used to rinse the beaker and the water rinse was then added to the round bottom flask. The pre-emulsion was stirred and sparged with nitrogen for 30 minutes followed by the addition of a free-radical initiator VAZO-56 (0.09 g in 4.75 g water). The temperature was then increased to 65° C. (149° F.) and held for 1 hr under a nitrogen atmosphere. This resulted in the formation of the stage 1 emulsion.

Thereafter, a separate pre-emulsion was prepared in a plastic beaker by sonifying a mixture of: deionized water (12.3 g); ETHAL TDA-5 (0.59 g); ETHOQUAD 18/25 (2.1 g, 20% solution); $F(CF_2)_3OCF_2CF_2CH_2CH_2OC(O)-C(CH_3)=CH_2$ (6.59 g); poly(oxy-1,2-ethanediyl), α-(2-methyl-1-oxo-2-propenyl)-ω-hydroxy-) (0.17 g); 2-propenoic acid, 2-methyl-, octadecyl ester (2.1 g); 2-propenamide, N-(hydroxymethyl)- (0.2 g); 2-propenoic acid, 2-methyl-, 2-hydroxyethyl ester (0.09 g); 1-dodecanethiol (0.05 g); and dipropylene glycol (2.5 g). The separate pre-emulsion was then added to the round bottom flask containing the stage 1 emulsion. The mixture was then purged with nitrogen for 30 minutes followed by the addition of a free-radical initiator (0.05 g VAZO-56 in 4.5 g water). The flask remained at 65° C. for an additional 4 hours after which it was cooled to room temperature. Sodium lauryl sulfate (0.05 g) surfactant in water (15.0 g) was then added. Finally, the resulting solution/mixture was gravity filtered using a milk filter and diluted to 25% solids. The product contained 4.6% fluorine. The product was applied to fabric using Test Method 1 to achieve 1900 micrgrams per gram fluorine on the fabric, and was tested for repellency and durability using Test Methods 2 to 5. The results are in Table 3.

Comparative Example C

The process of Example 3 was repeated, with the exception that the particle was not included in the preparation of the first-stage emulsion. The product was applied to fabric using Test Method 1 to achieve 1900 micrgrams per gram fluorine on the fabric, and was tested for repellency and durability using Test Methods 2 to 5. The results are in Table 3.

Example 4

The product of Example 1 was applied to the fabric using Test Method 1, but at a level of 3% by weight in the pad bath to provide 1140 micrograms per gram fluorine on the fabric, and the fabric was tested for repellency and durability using Test Methods 2 to 5. The results are in Table 3.

Comparative Example D

Comparative Example D was a commercially available fluorinated(meth)acrylate-based copolymer containing a mixture of homologues of perfluoroalkyls groups having from 6 to 14 carbons. The typical mixture comprised the following: 6 carbons, 27% to 37%; 8 carbons, 28% to 32%; 10 carbons, 14% to 20%; 12 carbons, 8% to 13%; 14 carbons, 3% to 6%. The product contained 10% fluorine. Comparative Example E was applied to the fabric using Test Method 1, but at a level of 3% by weight in the pad bath to provide 2375 micrograms per gram fluorine on the fabric, and the fabric was tested for repellency and durability using Test Methods 2 to 5. The results are in Table 3.

TABLE 4

Test results for Oil-, Water-, and Spray Repellency.

| Example | µg/g F on Fabric | Oil Repellency | | | | Water Repellency | | | | Dynamic Water (Spray) Repellency | | | |
|---|---|---|---|---|---|---|---|---|---|---|---|---|---|
| | | Initial | 5 HW | 10 HW | 20 HW | Initial | 5 HW | 10 HW | 20 HW | Initial | 5 HW | 10 HW | 20 HW |
| 1 | 1900 | 6 | 6 | 6 | 5 | 12 | 12 | 11 | 10 | 85 | 80 | 75 | 70 |
| Comparative A | 1900 | 3 | 2 | 2 | 2 | 8 | 8 | 7 | 6 | 70 | 70 | 70 | 50 |
| 2 | 1900 | 5 | 5 | 5 | 4 | 11 | 10 | 9 | 8 | 70 | 60 | 60 | 50 |
| Comparative B | 1900 | 4 | 4 | 3 | 1 | 5 | 5 | 5 | 5 | 70 | 60 | 60 | 50 |
| 3 | 1900 | 6 | 6 | 6 | 6 | 12 | 11 | 11 | 11 | 70 | 60 | 60 | 50 |
| Comparative C | 1900 | 6 | 6 | 6 | 6 | 12 | 11 | 11 | 11 | 60 | 60 | 60 | 50 |
| 4 | 1140 | 6 | 6 | | 6 | 12 | 12 | | 11 | 100 | 85 | | 60 |
| Comparative D | 2375 | 6 | 6 | | 3 | 10 | 9 | | 7 | 100 | 85 | | 70 |

Compositions containing 2-stage polymers containing hydrophobized particles of this invention show comparable or improved oil-, water-, and/or spray-repellency when compared to compositions that do not contain the hydrophobized particles as shown in Table 4. Example 1 had improved oil-, water-, and spray-repellency for the 0 (initial), 5, 10, and 20 HW (home washes) when compared to the non-particle containing Comparative Example A at equal fluorine loadings. Example 2 had a improvement of oil repellency and water repellency and equivalent dynamic water repellency for the 0 (initial) and 5 HW and a bigger improvement at 10 and 20 HW when compared to the non-particle containing Comparative Example B at equal fluorine loadings. Example 3 had equivalent oil-, water-, and spray-repellency for the 5, 10, and 20 HW (home washes) when compared to the non-particle containing Comparative Example C at equal fluorine loadings.

Comparative Example D was a commercially available (meth)acrylate based product containing no particles and having a mixture of perfluoroalkyl groups of different carbon chain lengths ranging from 6 to 14 carbons. The total fluorine content of Comparative Example D was 10%, versus 4.8% for the Examples of the invention. Example 4 was applied to the fabric at a level of 1140 micrograms per gram fluorine, while Comparative Example D was applied to the fabric at a level of 2375 micrograms per gram fluorine. Despite Example 4 having less than half the fluorine content of Comparative Example D, Example 4 provided superior water repellency and oil repellency, and comparable dynamic water repellency. This demonstrated that the polymers of the present invention provide the same or superior surface effects with less fluorine thus providing fluorine efficiency compared to conventional treating agents.

What is claimed is:

1. A polymer composition comprising
   A) a first polymer comprising, on a water free basis,
      (a) from about 0.1% to about 1.0% by weight hydrophobized nanoparticles;
      (b) from about 89% to about 99.8% by weight of one or more monomers of $C_1$ to $C_{18}$, straight, branched, or cyclic alkyl(meth)acrylate;
      (c) from about 0.1% to about 10.0% by weight of one or more monomers selected from the group consisting of N-methylol(meth)acrylamide and monomers of formula (I)

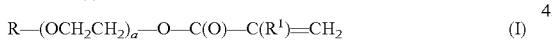

$$R-(OCH_2CH_2)_a-O-C(O)-C(R^1)=CH_2 \quad (I)$$

wherein a is 1 to about 10, R is hydrogen, $C_1$-$C_4$ alkyl, or —C(O)—C($R^1$)=CH$_2$, and $R^1$ is H
   said first polymer in contact with
   B) a second polymer comprising, on a water free basis,
      (d) from about 70% to about 90% by weight fluorinated monomer of formula (II)

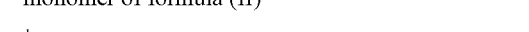

$$R_f^1\text{-L-X-C(O)-C(R)=CH}_2 \quad (II)$$

wherein $R_f^1$ is a monovalent, partially or fully fluorinated, linear or branched, alkyl radical having 2 to about 7 carbon atoms; optionally interrupted by 1 to about 6 catenary oxygen atoms; wherein the ratio of carbon atoms to oxygen atoms is at least 2:1 and no oxygen atoms are bonded to each other;
   L is a bond or a linear or branched divalent linking group having 1 to about 20 carbon atoms, said linking group optionally interrupted by 1 to about 4 hetero-radicals selected from the group consisting of —O—, —NR$^6$—, —S—, —SO—, —SO$_2$—, and —N(R$^6$)C(O)—wherein R$^6$ is H or $C_1$ to $C_6$ alkyl, and said linking group optionally substituted with CH$_2$Cl;
   X is —O—, —N(R)—, or —S—, wherein R is H or CH$_3$;
      (e) from about 10% to 30% by weight of one or more monomers of $C_1$ to $C_{18}$, straight, branched, or cyclic alkyl(meth)acrylate; and
      (f) from about 0.1% to about 10% by weight of one or more monomers selected from the group consisting of N-methylol(meth)acrylamide and monomers of formula (I)

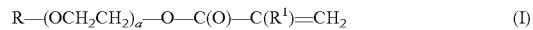

$$R-(OCH_2CH_2)_a-O-C(O)-C(R^1)=CH_2 \quad (I)$$

wherein R is hydrogen, $C_1$-$C_4$ alkyl, or —C(O)—C($R^1$)=CH$_2$, and $R^1$ is H or —CH$_3$; provided that the first polymer comprises from about 20% to about 75% by weight of the polymer composition;
   wherein the nanoparticles are a surface modified inorganic oxide particle comprising an oxide of M atoms independently selected from the group consisting of Si, Ti, Zn, Zr, Mn, Al, and combinations thereof; at least one particle having a surface covalently bonded to at least one group represented by formula (IV)

$$(-L^2-)_d(-L^3)_c(-Si-R^7_{(4-d)}) \quad (IV)$$

wherein:
   $L^2$ represents an oxygen covalently bonded to M; and each $L^3$ is independently selected from the group consisting of H, a $C_1$-$C_2$ alkyl, and OH; d and c are integers such that: d is greater than or equal to 1, c is greater than or equal to 0, and the sum (d+c) is less than or equal to 3; and
   $R^7$ is a linear, branched, or cyclic alkyl group containing 1 to 18 carbon atoms.

2. The polymer of claim 1 wherein $R_f^1$ is $F(CF_2)_n$, $F(CF_2)_n(CH_2)_x[(CF_2CF_2)_p(CH_2CH_2)_q]_m$, $F(CF_2)_nO(CF_2)_n$, $F(CF_2)_n\text{OCFHCF}_2$, or $F(CF_2)_n[OCF_2CF(CF_3)]_p[OCF_2CF_2]_q$, wherein n is 1 to about 6; x is 1 to about 6; and p, q, and m are each independently 1 to about 3.

3. The polymer of claim 1 wherein L is a bond, $R^5$, $R^6$-A, A, or ethylene oxide, wherein
   A is $C_1$-$C_6$ alkyl and $R^5$ is a divalent radical selected from the group consisting of —S(CH$_2$)$_u$—,

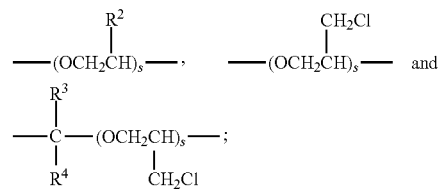

u is an integer of from about 2 to about 4;
s is an integer of 1 to about 50; and
$R^2$, $R^3$, and $R^4$ are each independently hydrogen or an alkyl group containing 1 to about 6 carbon atoms.

4. The polymer of claim 1 wherein formula (II) is selected from the group consisting of $F(CF_2)_n(CH_2)_x\text{X}-\text{C(O)}-\text{C}(R)=CH_2$, $F(CF_2)_n(CH_2CF_2)_p(CH_2CH_2)_q(R^5)_r\text{X}-\text{C(O)}-\text{C}(R)=CH_2$, $F(CF_2)_nO(CH_2)_x[(CF_2CF_2)_p(CH_2CH_2)_q]_m(R^5)_r$, $\text{X}-\text{C(O)}-\text{C}(R)=CH_2$, $F(CF_2)_n(CF2)_n\text{CH}_2(C_tH_{2t})\text{X}-\text{C(O)}-\text{C}(R)=CH_2$, $F(CF_2)_n-\text{OCFHCF}_2(\text{OCH}_2\text{CH}_2)_v\text{X}-\text{C(O)}-\text{C}(R)=CH_2$
wherein
t is an integer of 1 to 10;
n is an integer of about 1 to 6;
p, q, and m are each independently an integer of 1 to 3;
x is an integer of 1 to 6 r is 0 or 1;
X is —O—, —NH— or —S—;
R⁵ is a divalent radical selected from the group consisting of —S(CH₂)$_u$—,

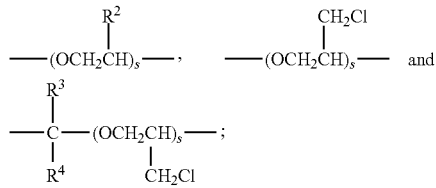

u is an integer of 2 to 4;
s is an integer of 1 to 50;
v is an integer of 2 to 4;
R², R³, and R⁴ are each independently hydrogen or an alkyl group containing 1 to 6 carbon atoms.

5. The polymer of claim 4 wherein n is 4 to 6, p, q, and m are each 1; and r is 0.

6. The polymer of claim 1 wherein the hydrophobized nanoparticles comprise Si, Ti, Zn, Mn, Al, or Zr.

7. The polymer of claim 1 wherein the hydrophobized nanoparticles have an average particle size of from about 10 to about 500 nm.

8. The polymer of claim 1 wherein the second polymer further comprises at least one surfactant.

9. The polymer of claim 1 in the physical form of the first polymer as a core surrounded completely or partially by the second polymer as a shell.

* * * * *